US005381382A

United States Patent [19]

Marschall

[11] Patent Number: 5,381,382

[45] Date of Patent: Jan. 10, 1995

[54] NOISE SHIELDED HYDROPHONE

[76] Inventor: Richard A. Marschall, 5115 Echo Pines Cir. E., Ft. Pierce, Fla. 34951

[21] Appl. No.: 106,203

[22] Filed: Aug. 12, 1993

[51] Int. Cl.[6] ........ G01V 1/38

[52] U.S. Cl. ........ 367/20; 367/154

[58] Field of Search ........ 367/20, 154, 15, 16, 367/17, 18, 141, 176

[56] References Cited

U.S. PATENT DOCUMENTS 3,860,899 1/1975 Watlington ........ 367/20
3,893,065 7/1975 Lea et al. ........ 367/20
4,090,168 5/1978 Miller et al. ........ 367/20
4,694,436 9/1987 Gelfand ........ 367/20
4,958,329 9/1990 Marschall ........ 367/20

*Primary Examiner*—Ian J. Lobo
*Attorney, Agent, or Firm*—Alexander Norcross

[57] ABSTRACT

An improved hydrophone body, suitable for forming an array of towed hydrophone bodies or "fish", formed by placing an acoustic shield or scatterer in the nose and tail sections of the hydrophone body to reduce noise coupling from the cable into the hydrophone sensor. This resulting hydrophone has significantly reduced background noise interference.

6 Claims, 2 Drawing Sheets

NOISE SHIELDED HYDROPHONE

BACKGROUND OF THE INVENTION

This patent pertains to the field of hydrophones, and especially to arrays of hydrophones for use as towed active sensing devices. Such arrays are used to perform active sound imaging, and depend on a plurality of spaced, active sonic transducers at a controlled spacing for providing data which cannot be obtained readily from a single hydrophone.

U.S. Pat. No. 4,733,379 to Lapetina et al, discloses a form of towed hydrophone array of a type being a uniform diameter linear tube containing individual hydrophone transducers periodically spaced therein. This patent places great emphasis on acoustic cross coupling between each of the transducers. The transducers shown in the preferred drawing are orthogonal to each other, rotated at 90 degree angles.

Massa, U.S. Pat. No. 2,440,903 is an earlier towed array patent again showing a hose type streamer, and specifically claiming the interior, periodic structure of a transverse transducer and window, described internally as being flush with the hose for minimum turbulence. Despite this FIG. 1 discloses a structure No. 21 which is never used in the Art, primarily because any such protuberance would produce excessive noise.

In terms of towed, fish shaped or streamlined sensors, an early patent, U.S. Pat. No. 1,487,138 to Atwood, discloses a single towed elongate structure with tapered ends. At the time of this patent specifically the Art considered that the proper means of reducing the noise due to the rush of water past the towed article (the "fish") was by deployment at either a very low speed or zero forward speed with relative to the water. Despite the introduction of the uniform external cross-section tube, current towed arrays are still severely speed limited because of noise effects.

U.S. Pat. No. 3,842,398 to Massa shows, incident to an invention involving the interconnection of a hydrophone and a towed, expendable velocimeter, a construction for a towed hydrophone array showing a bulbous shaped hydrophone attached to a cable. The hydrophone is described as being embedded in a rigid potting compound, coated with a rubber or rubber-like coating and forming a blended streamline attachment to the outer jacket of the cable.

U.S. Pat. No. 3,990,035 to Byers discloses a hydrodynamically streamlined sonar apparatus. The housing shape is specifically described as being substantially oval in cross section through the length of the object and circular in cross section transverse to the direction of towing. The shape is further restricted to being a Joukowski streamlined shape and the housing is described as being principally rigid solid material. All the transducers of the array are enclosed in but a single housing.

U.S. Pat. No. 3,611,276 to Massa describes one of the velocimeters cited in Donald Massa's above cited U.S. Patent. Massa discloses a particular shape for free falling velocimeter having a predictable fixed rate of fall. Further the dropped device is a transmitter; therefore, there is no particular consideration for sensitivity or noise. Massa does describe the dimension of the streamlined probe with respect to the wave length of the sound waves concerned (note Column 4, line 65–75). Massa's shape is intended to achieve a stable free fall rate; turbulence effects are not addressed.

U.S. Pat. No. 4,031,502 to Lefaudeux, et al and U.S. Pat. No. 4,709,361 to Dahlstrom, et al are also of interest for the design of sensor shapes.

My prior patent 4,958,329, incorporated herein by reference, teaches and discloses a construction and hydrodynamic shape for a hydrophone body which has significantly reduced turbulence noise at the location of the hydrophone sensor. This body permits the construction of hydrophone arrays interconnected by thinner, more flexible cables than the prior art.

SUMMARY OF THE INVENTION

It is known from my prior patent that, in the field of hydrophones, forming the hydrophones in a specified teardrop shape reduces turbulence noise around the hydrophones and increases its effectiveness. An array of such shapes,towed in series along a cable, has significantly lowered levels of turbulence induced noises. However, fluid flow along the interconnecting cable still generates turbulent boundary layer noise which propagates into the neighboring hydrophones.

The current invention discloses an improved hydrophone housing, suitable for forming an array of towed hydrophone housings or "fish", formed by placing an acoustic shield or scatterer in the nose and tail sections of the hydrophone to reduce noise coupling from the cable into the hydrophone. This fish has significantly reduced background noise interference.

This construction makes feasible a sequential array of hydrophones strung along the cable which is towed behind a ship in water.

It is thus an object of this invention to show a construction of a hydrophone body which makes feasible a low noise towed array of such bodies.

It is a further object of this invention to disclose a construction for an array of hydrophones which is significantly less susceptible to noise generated from turbulent boundary flow along and vibrations of the towing cables.

DETAILED DESCRIPTION OF THE PREFERRED EMBODIMENT

Figure 1:
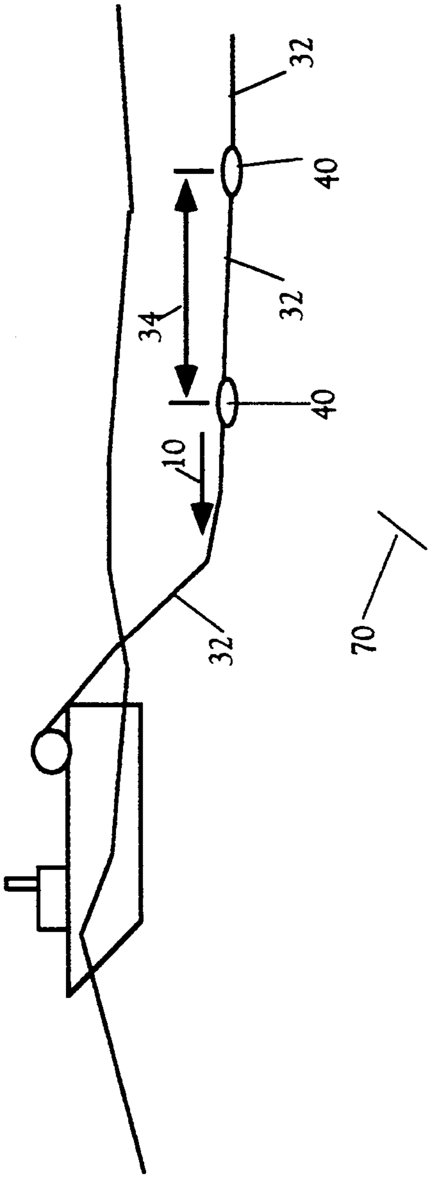
FIG. 1 is an illustrative depiction of a towed array of the invention, not to scale.
Figure 2:
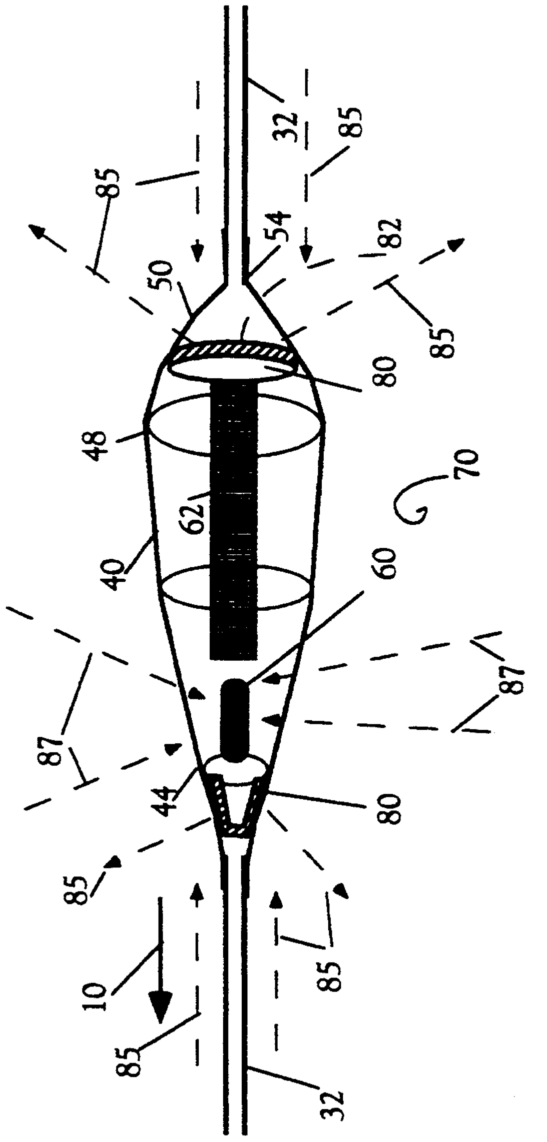
FIG. 2 is a section view of a hydrophone body of the invention.

Applicant here shows as an exemplary form of applicant's invention a particular hydrophone body designed for a particular towed hydrophone array.

This example is described in some detail as to its shape and its external configuration for the purposes of conveniently providing a describable example and illustrating the best mode known to the applicant of carrying out his invention. However, as the invention is of an improvement to a hydrophone body for containing an acoustic sensor, the form of the primary acoustic sensor 60, the supporting electronics, and the electric circuit and cabling are not described, being well understood in the art. It is sufficient, for the purposes of describing this invention, that the towing cable described below both provides a towing force for the hydrophone, spaces the hydrophone, and maintains an electrical and signal connection between individual hydrophones within each hydrophone body and data analysis equipment on board a towing vessel.

Throughout this discussion, it should be understood that the specific shapes and spaces given are not restrictive but rather are examples.

Parsons, et al "The Optimum Shaping of Axisymmetric Bodies for Minimum Drag in Incompressible Flow", J. Hydronautics, Vol. 8 No. 3, Jul. 1974, pp. 100–107 discusses a known series of body shapes generally known as "hydrodynamically smooth"; this is defined as bodies which have a cross sectional geometric section, following a described procedure attributed to Granville, in which the body outline is continuous through the second derivative, without unwanted inflection.

Considerable research exists in regards to the forming of shapes for the reduction of drag in towed vehicles in an incompressible media such as water, in each case seeking to reduce the total force required to tow vehicles either at low or at relatively high speeds, low speeds being in the vicinity of 0–3 or 5 knots, high speeds being at 20 knots or above. Some such research indicates drag may be reduced by reducing boundary layer separation from the shape. Equally, it is recognized that controlled turbulent flow may reduce drag, especially at high Reynolds numbers.

Separately, research has indicated that boundary layer separation may be minimized by providing a coating on the body which provides a distributed damping effect, especially at higher Reynolds Numbers. See for instance, Kramer "Boundary-Layer Stabilization by Distributed Damping", ASME Journal, February 1960, p. 245–233, describing the use of a heavy diaphragm outer coating, damped by an internal liquid dampening for reducing boundary layer separation and turbulent generation in a towed hydrodynamic body.

Separately it has been discovered in incompressible fluid flow (at high Reynolds) Numbers that controlled turbulence onset may be utilized to reduce drag. The common golf ball is a prevalent exemplar of this.

In a towed hydrophone array, of the class of the instant invention, the total drag on the array is a very minor consideration. The invention of my prior patent provides however, a hydrophone of increased sensitivity by eliminating or reducing the turbulence noise of the hydrophone body. As a consequence, other, formerly ignored sources of noise now become the limiting criteria on the operating capability of a hydrophone array. The principal consideration remains the problem of acoustical noise, especially within the frequency range of primary interest to the hydrophones; in seismic hydrophones this is predominantly low acoustical frequencies ranging from 500 down to 17 hertz or lower. Flow separation or turbulence within an otherwise laminar boundary flow along the interconnecting cables between hydrophones in an array cannot be avoided. The noise generated by this partly turbulent fluid flow is now a limiting factor on sensitivity of the array.

Turbulent boundary layer (TBL) noise decays as the hyperbolic cosine of the distance between the turbulent boundary layer and the receiver. Generally hose arrays, and therefore the towing cable between hydrophones, have a noise floor mostly caused by turbulent boundary layer noise. This noise is decreased as the diameter of the interconnecting cable between hydrophone bodies is decreased, but there is a minimum diameter requires for sufficient towing strength and by the diameter of the electrical and signal cables which pass through the towing cable.

TBL wall pressure noise travels very slowly, around the convective velocity; its wavelengths are very small at frequencies acoustic interest. In seismic arrays, the distance between individual hydrophones and the group spacings are much greater than the half wavelengths of the TBL noise, and thus the TBL noise is spatially aliased and essentially impossible to filter out of seismic data.

Other sources of noise which result from the towing cable between hydrophones is extensional vibration induced noise. Prior art oil filled hose arrays converted extensional vibrations into bulge wave noise. The hydrophone arrays of my prior art patent significantly reduce this source of noise, but some residual extensional vibration noise remains.

Transverse vibration of the towing cable also produces noise. Again, while the hydrophone construction of my prior patent minimizes such transverse vibrations as compared to the hose arrays of the prior art, some transverse vibration remains.

My prior patent discloses an array, towed by a towing cable, having a defined smoothness and varying thickness, but of a size minimally established by connecting cables and the need for a towing strength. Spaced along the cable are individual hydrophone bodies of the inventive type.

The inventive hydrophone bodies 40 are more particularly shown by the exemplar model shown in FIG. 3. The body 40 is externally hydrodynamically smooth. Ignoring the towing cable 32 which is connected to both the nose 44 and the tail 50 of the body 40, a cross section through the body 40 along a plane parallel to the direction of tow would show a smooth curve rising to a point of maximal cross-sectional diameter 48 from nose 44 to mid-body 48 and then decreasing to the tail 50; the curve preferably would have no points of inflection. At a minimum, mathematically the curve would have continuous second order derivatives.

It should be noted that no points of inflection is an impossible condition to meet at the point 54 at which the body 40 adjoins the tail towing cable (also called a bridle) 32 where a point of a inflection of necessity must occur.

This hydrophone body 40 is constructed of a material having an acoustic impedance to match water. Acoustic impedance is defined as the product of the density and the speed of sound in a medium. Such materials may be, for example, elastomers, including polyurethanes, poly vinyl chloride, rubber or gel or fluid filled bodies. This chosen impedance maximizes acoustic coupling between the primary hydrophone sensor 60 and the surrounding medium 70 (usually water) through which the hydrophone array is being towed. Generally the acoustic impedance of the hydrophone body 40 is chosen to closely match the acoustic impedance of this surrounding medium 70, to minimize acoustic refraction effects.

The shape of this body 40 therefore minimizes noise from turbulent or non laminar flow along the hydrophone body 40. However, flow separation still occurs along the interconnecting cable 32, and at the rear or tail section 50 of the hydrophone body 40 where curvature is negative. Turbulent boundary layer noise also occurs along the interconnecting cable 32. These noises propagate acoustically through the water 70 and the cable 32, and also propagate as transverse and extensional vibration through the interconnecting cable 32, affecting the neighboring hydrophones 60.

I reduce this noise coupling by providing acoustic scatterers 80 in the nose 44 and tail 50 of the hydrophone body 40. These scatterers 80 are provided by forming the nose 44 and tail 50 sections, or a surface 82 within the nose 44 and tail sections 50, of a material having a significantly different acoustic impedance than the acoustic impedance of the material of the hydrophone body 40. This scatterer 80 material has a significantly higher or lower acoustic impedance than the material used to form the hydrophone body 40. One suitable material is a formed stainless steel or metal shield or plate formed within the hydrophone body 40 within the nose 44 and the tail 50. Metal has a sufficiently different acoustic impedance than water that using metal provides the desired sudden discontinuous acoustic medium, even for the hydrophone bodies 40 having varying flexural rigidity.

Metal may increase the weight of the array unacceptably. In such case a material of significantly lower acoustic impedance may be used to form the scatterers. For example, an air filled foam has such lower acoustic impedance, and would serve to form a lightweight scatterer 80.

By providing an acoustic discontinuity at the nose 44 and the tail 50, noise 85 which would otherwise propagate into the hydrophone sensor 60 from the nose or the tail region is reflected away from the sensor 60. The desired acoustic information 87, which comes in from the side of the hydrophone body, is not attenuated.

In one embodiment, the scatterers are provided by internal shaped metal plate scatterers 80 internally set within hydrophone body 40. A nose scatterer 80 is spaced within, and coupled to the nose shell section 44, as close as practicable to the point of attachment of the nose towing bridle 32. This scatterer 80 is a metal shield, formed of stainless steel, shaped as a truncated cone, following generally the surface curvature or shape of the nose surface 44 of the hydrophone body 40, and embedded in the hydrophone body 40 near this nose surface 44. The scatterer 80 extends outwardly so that it is interposed between the hydrophone sensor 60 and a forward view from the sensor 60 into the medium 70 along the towing cable 32; it does not extend so far as to be interposed between the sensor 60 and a side view into the surrounding medium 70.

A second or tail scatterer 80 is mounted in the aft of the body 40 close to the tail section 50. The individual hydrophone bodies 40 themselves are spaced apart on the cable (bridle) 32 at a considerable multiple, in the particular example a distance 34 fourteen times the length 36 of an individual body, along the hydrophone towing cable 32. This tail scatterer 80 is a metal plate. It may be formed to match the curvature of the tail of the hydrophone body, or, as shown, it may be a disc or plate 80. Scatterer 80 extends outward only sufficiently to block a straight line view of the hydrophone sensor 60 into any turbulence or flow separation resulting from the negative curvature at the rear of the body 50, and any turbulence or vibrational noise eminating from the following cable 32.

The shape of each scatterer 80 may be a flat disk, or may be conical, or may be a spherical,elliptical, paraboloid or hyperboloid section. The shape and form of the nose 44 scatterer 80 will generally follow the surface shape of the nose section 44 of the hydrophone body 40, due to the relatively restricted cross section of the nose section 44. The tail scatterer 80 may be a flat disk, which will fit within the wider tail section 50 without unduly masking the internal hydrophone sensor 60. The scatterer surface 82 should interpose between the sensor 60 and a view along the towing cable 32, either forward or aft. The scatterer 80 should not extend so far as to cover a side view of the sensor 60 into the fluid medium 70.

Turbulence and boundary layer separation, and towing cable vibration, along the extended length of the interconnecting towing cable 32, produces acoustic noise. This resulting noise acts as though it flows along the bridle 32 to the successive hydrophone bodies, and normally would couple into the contained hydrophone sensor from the front and rear of the body 40. In the inventive body, such noise is deflected outward by reflection due to the discontinuous acoustic impedance between the normal hydrophone body material and the high or low acoustic impedance scatterer material. This outward reflection may enhanced by the relative angle between the surface of discontinuity resulting from the angle of the scatterer if it follows the general shape of the nose or tail of the hydrophone body.

In the preferred embodiment here disclosed, the specific sizes and dimensions of both the hydrophone body and the hydrophone body spacing distance 34 are determined by the acoustics of the desired frequency sensitivity of the hydrophone array. Given an assumed constant speed of sound within a fluid media, (for the purposes of this example the speed of sound in saltwater is 1500 meters per second), the array is designed to be spaced so that the spacing 34 between successive hydrophone bodies **40*a*, 40*b*** is one-half wave length at the highest frequency of interest.

For example, with a frequency sensitivity having a highest interest frequency of 500 hertz, the array would be spaced with hydrophones at 1.5 meter intervals; a 250 hertz array would have a three meter spacing between hydrophone bodies. A full seismic array would then be built of sections having periodically spaced hydrophone bodies of the described type; a typical array would have as many as 960 such bodies and could extend over two kilometers long.

Noise from flow separation around the hydrophone body is minimized by utilizing a hydrodynamically smooth body. Separated flow generates broad band noise. Noise from any remaining turbulence and vibration along the cable is minimized by the acoustic scatterers within the nose and tail of the hydrophone body.

The most significant residual noise sources on towed arrays of hydrodynamically smooth hydrophone bodies remain the turbulent boundary layer (TBL) noise on the interconnecting electromechanical cable ahead of each hydrophone body, and the negative pressure gradient area at the tail section of each body. The acoustic scatterers of the invention, together or separately, serves to reduce the sensor's reception of these noise sources. These scatters, the material regions where the acoustic impedance differs significantly from the surrounding medium, reduce received noise in tow ways.

first, the acoustic scatterers reflect noise back to their sources, serving as a noise block. Second, noise that does get past the scatterers tends to be reflected between them, in the case of both a nose and tail scatterer, or to pass the hydrophone sensor twice in the case of one scatterer. Either event averages out the noise level. Effectively, the effective aperture of the hydrophone sensor is extended by being near a scatterer. This mechanical extended aperture effect is particularly pronounced when the sensor is flanked on both sides by scatterers.

Also, other noise sources traveling up and down the array will also be attenuated by the inventive acoustic scatterers. High frequency acoustic noise arriving in directions collinear with the array, such as towing ship noises, will be reduced. Mechanically induced noises from the transverse and extensional vibrations of the towing cables will also tend to be reflected away from the hydrophone sensors or averaged out near the sensors.

While a preferred configuration has been herein disclosed, it should be apparent that a wider variation of particular shapes is achievable within the general structure herein shown by the inventor. The invention is not therefore restricted to the particular variation shown here for illustrative purposes but rather to that wider range of variations as are inherent in the art.

I claim:

1. A low noise hydrophone of the type towed by a cable through a medium comprising:

a hydrodynamically smooth shape of a material having a first acoustic impedance, having a nose section attached to said towing cable, and a tail section attached to another section of said towing cable;

an active acoustic sensor within said hydrophone;

an acoustic scatterer embedded within said nose section intermediate said sensor and said cable;

an acoustic scatterer embedded within said tail section intermediate said sensor and said cable;

each said acoustic scatterer comprising a surface of a material having a second, different acoustic impedance;

each said acoustic scatterer being interposed between said acoustic sensor and a view into the medium along the cable.

2. The apparatus as described in claim 1 above, wherein each said acoustic scatterer is a shaped sheet of said different acoustic impedance material shaped to follow the surface shape of said hydrodynamically smooth shape.

3. The apparatus as described in claim 2 above, wherein said sheet is a stainless steel sheet.

4. The apparatus of claim 1 above, further comprising:

said surface extending a distance such that it extends between said sensor and said towing cable but not extending over the sides of said sensor.

5. A linear hydrophone array for sonic imaging in a band of frequencies comprising:

a plurality of sequentially towed underwater hydrophones, each further comprising:

an elongate, tubular nosed bridle affixed smoothly from a tail section of one said hydrophone to a nose section of a subsequent hydrophone;

said hydrophone having an acoustic impedance;

an acoustic scatterer comprising a shaped sheet of a material having a different acoustic impedance, and embedded within said nose section, said sheet shaped to present an acoustic discontinuity surface within said nose section, said surface being at an angle to said bridle section and interposed between an acoustic sensor within said hydrophone and a view into water along said bridle.

6. A linear hydrophone array for sonic imaging in a band of frequencies comprising:

a plurality of sequentially towed underwater hydrophones, each further comprising:

a hydrophone, having a nose section and a tail section;

said hydrophone having an acoustic impedance;

an elongate, tubular towing cable section affixed smoothly to said tail section, forming a region of streamflow negative inflection;

an acoustic scatterer comprising a shaped sheet of a material having an acoustic impedance differing from the acoustic impedance of the hydrophone, and embedded within said tail section, said sheet shaped to present a acoustic discontinuity surface within said tail section, said surface being transverse to said towing cable section, and blocking a view from an acoustic sensor, within said hydrophone, into said region of negative inflection.

* * * * *